(12) United States Patent
Jensen

(10) Patent No.: US 8,589,037 B2
(45) Date of Patent: Nov. 19, 2013

(54) ELECTRIC DRIVE CONTROL FOR A MACHINE

(75) Inventor: Jeffrey E. Jensen, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 275 days.

(21) Appl. No.: 13/211,376

(22) Filed: Aug. 17, 2011

(65) Prior Publication Data

US 2013/0045072 A1 Feb. 21, 2013

(51) Int. Cl.
*G06F 7/70* (2006.01)

(52) U.S. Cl.
USPC .......................................................... 701/50

(58) Field of Classification Search
USPC .......................................................... 701/50
See application file for complete search history.

(56) References Cited

U.S. PATENT DOCUMENTS

| | | | |
|---|---|---|---|
| 3,749,269 | A | 7/1973 | Conrad |
| 3,943,306 | A | 3/1976 | Aihara |
| 4,017,739 | A | 4/1977 | Hapeman |
| 5,456,333 | A | 10/1995 | Brandt |
| 7,519,462 | B2 | 4/2009 | Brown |
| 7,853,382 | B2 | 12/2010 | Anderson |
| 2010/0094492 | A1 | 4/2010 | Filla |

*Primary Examiner* — James Trammell
*Assistant Examiner* — Michael D Lang

(57) ABSTRACT

A control system for a machine having a power source, one or more electric propulsion motors connected to the power source, and one or more lift and tilt cylinders. The control system includes an input unit, a processing unit and a control module. The input unit is configured to receive pressure values corresponding to the lift and tilt cylinders. The processing unit is configured to compare the pressure values to threshold pressure values for the lift and tilt cylinders to generate an operative signal. Further, the control module is configured to control electrical energy supplied to the one or more electric propulsion motors from the power source based on the operative signal.

20 Claims, 3 Drawing Sheets

US 8,589,037 B2

ELECTRIC DRIVE CONTROL FOR A MACHINE

TECHNICAL FIELD

The present disclosure relates to an electric drive control for a machine, and particularly to an electric drive control including a control system.

BACKGROUND

Machines used in earth moving operations are well known in the art. These machines, used for lifting and handling of loads, may be electrically propelled and use electric propulsion motors to run the drive wheels. During operation, an operator may provide a command to control the power supplied to the electric propulsion motors to determine a torque output to the drive wheels.

U.S. Pat. No. 7,853,382 (hereafter referred to as '382 patent) discloses a machine having a loader boom. The '382 patent further discloses a controller adapted to determine boom velocity and compare the boom velocity to a commanded velocity to obtain a velocity error, and to de-rate the engine to reduce tractive effort of the wheels in response to the obtained velocity error.

SUMMARY

In one aspect, the present disclosure provides a control system for a machine having a power source, one or more electric propulsion motors connected to the power source, and one or more lift and tilt cylinders. The control system includes an input unit configured to receive pressure values corresponding to the lift and tilt cylinders. The control system further includes a processing unit configured to compare the pressure values to threshold pressure values for the lift and tilt cylinders. The processing unit generates an operative signal based on the comparison. The control system also includes a control module configured to control electrical energy supplied to the one or more electric propulsion motors from the power source based on the operative signal.

In another aspect, the present disclosure provides a method for operating a machine. The method includes receiving the pressure values corresponding to the lift and tilt cylinders. The method further includes comparing the pressure values with the threshold pressure values for the lift and tilt cylinders. The method further includes generating the operative signal when the pressure value is more than the threshold pressure value. The method further includes controlling the electrical energy supplied to the one or more electric propulsion motors based on the operative signal.

Other features and aspects of this disclosure will be apparent from the following description and the accompanying drawings.

DETAILED DESCRIPTION

Figure 1:
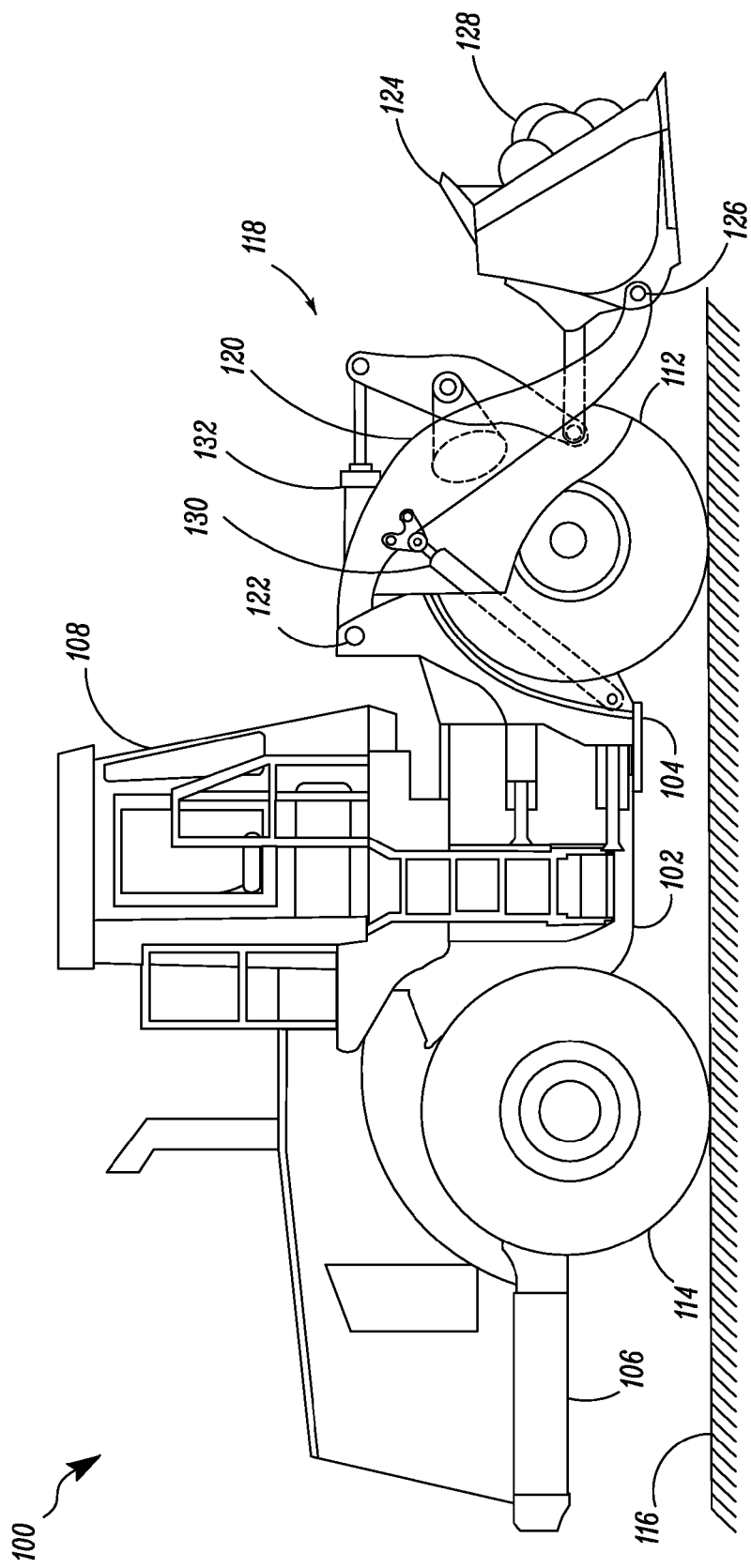
FIG. 1 illustrates a schematic view of a machine.

A machine 100 in which various disclosed embodiments may be implemented is schematically illustrated in FIG. 1. The machine 100 may be used for lifting and/or handling a load. The machine may include a wheel loader, a backhoe loader, an industrial loader, a skidder, a wheel tractor, a wheel excavator, a wheel dozer, or the like. The machine 100 may be employed in various fields which may include, but not limited to, construction and mining.

In an exemplary embodiment, as illustrated in FIG. 1, the machine 100 may embody a wheel loader which includes a frame 102. The frame 102 may include a front section 104 and a rear section 106. In an embodiment, the front section 104 may be connected with the rear section 106 by an articulated joint (not shown). The machine 100 may further include an operator station 108 which contains one or more control means to control the operations of the machine 100. The machine 100 further includes ground engaging drive elements, such as front wheels 112 mounted on the front section 104 and rear wheels 114 mounted on the rear section 106. The front and the rear wheels 112 and 114 supports the machine 100 on the ground 116.

In an embodiment, the machine 100 may include a lift arm assembly 118 mounted on the front section 104 of the frame 102. The lift arm assembly 118 may include a lift arm 120 pivotally mounted at one end 122 to the front section 104. The lift arm assembly 118 may further include a bucket 124 pivotally mounted to the other end 126 of the lift arm 120. The lift arm assembly 118 may be operable to lift and handle a load 128.

In the lift arm assembly 118, the lift arm 120 and the bucket 124 may be configured to pivot relative to the front section 104 by lift cylinders 130 and a tilt cylinder 132. The lift and tilt cylinders 130 and 132 may be hydraulic or pneumatic cylinders, which are connected at one end to the front section 104. The lift cylinders 130 may be operatively connected to the lift arm 120, to raise or lower the lift arm 120 with respect to the front section 104. Further, the tilt cylinder 132, configured to tilt or rack the bucket 124 with respect to the front section 104.

Figure 2:
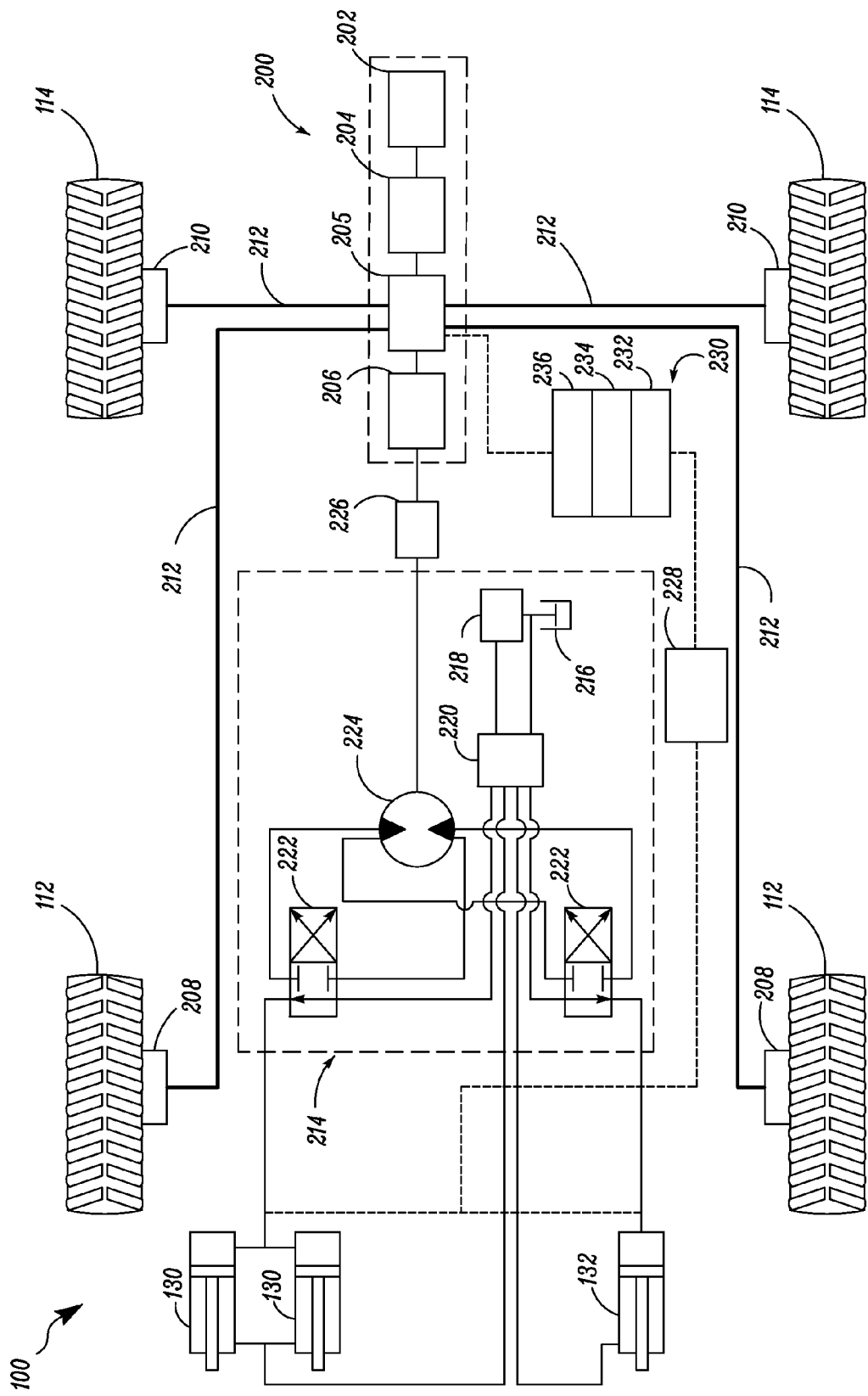
FIG. 2 illustrates a block diagram of the machine of FIG. 1, according to an embodiment of the present disclosure.

FIG. 2 illustrates a block diagram of the machine 100 according to an embodiment of the present disclosure. In an embodiment of the present disclosure, the machine 100 may include a power source 200. The power source 200 may provide the power to drive the various components of the machine 100. In an embodiment, the power source 200 may include an engine 202, such as an internal combustion engine, for example, a gasoline engine, a diesel engine, etc. The power source 200 may further include an electric unit 204 coupled to the engine 202. The electric unit 204 may work as a generator to convert the mechanical energy from the engine 202 into electrical energy. The power source 200 may further include power electronics 205 to control and/or convert the electrical energy from AC to DC or vice versa. Additionally, the power source 200 may also include a battery 206 electrically coupled with the power electronics 205 to store the electrical energy. The battery 206 may be any rechargeable battery such as a lead-acid battery, a nickel cadmium (NiCd) battery, a nickel metal hydride (NiMH) battery, a lithium ion (Li-ion) battery, or the like. In an embodiment, the electric unit 204 may work as an electric motor, converting electrical energy supplied from the battery 206 into mechanical energy to selectively drive the engine 202.

In an embodiment, the machine 100 may include electric propulsion motors 208 and 210 which may be associated with the front wheels 112 and the rear wheels 114, respectively. In an embodiment, the electric propulsion motors 208 and 210 may be variable speed, reversible AC or DC motors. The electric propulsion motors 208 and 210 may be electrically connected to the power electronics 205 through a bus 212 for receiving the electrical energy. The power electronics 205 may modify voltage and/or frequency of the electrical energy from the electric unit 204 and supply to the front and rear electric propulsion motors 208 and 210. Alternatively, the electric propulsion motors 208 and 210 may be directly connected to the electric unit 204. The electric propulsion motors 208 and 210 are operatively coupled with the front and the rear drive wheels 112 and 114 to provide a torque output. In an embodiment, the electric propulsion motors 208 and 210 may be connected to the front and the rear drive wheels 112 and 114 via one or more reduction gear sets.

Further, as illustrated in FIG. 2, the machine 100 may include a hydraulic circuit 214 which is fluidically coupled to the lift cylinders 130 and the tilt cylinder 132. The hydraulic circuit 214 may include a fluid source 216 for storing a fluid. The hydraulic circuit 214 may further include at least one implement pump 218 for providing flow. In an exemplary embodiment, the implement pump 218 may be mechanically powered via a mechanical coupling with the engine 202. In various other embodiments, the implement pump 218 may be electrically powered from the electric unit 204, the power electronics 205 or the battery 206. The hydraulic circuit 214 may also include an implement valve 220 to control the flow of the fluid to the lift and tilt cylinders 130 and 132, based on a command received from an operator.

In an embodiment, the hydraulic circuit 214 may also include one or more directional control valve 222 and a hydraulic motor 224. The directional control valve 222 may direct the fluid to the lift and the tilt cylinders 130 and 132 and allow the fluid to flow back into the hydraulic circuit 214, when the lift or the tilt cylinders 130 and 132 are in an idle condition. The hydraulic motor 224 may use the pressure head of the fluid flow back from the lift or the tilt cylinders 130 and 132 to generate electrical energy by an auxiliary generator 226, utilized to charge the battery 206.

According to an embodiment of the present disclosure, a sensor unit 228 may be connected to the lift and tilt cylinders 130 and 132. The sensor unit 228 may be configured to monitor the loading condition of the machine 100. In an embodiment, the sensor unit 228 may include pressure sensors using a piezo-electric circuit to generate a voltage or a current signal based on a movement of a piston in the lift and tilt cylinders 130 and 132. The measured voltage or current signals may represent pressure values based on the pressure of the fluid supplied to the lift and tilt cylinders 130 and 132, which in turn is indicative of the loading condition of the machine 100.

FIG. 2 further illustrates a schematic representation of a control system 230 used in the machine 100. The control system 230 may work in coordination with the various components of the machine 100, for monitoring and controlling the operation of the machine 100. The control system 230 may include an input unit 232, a processing unit 234 and a control module 236. In an embodiment, the input unit 232 may be configured to receive the pressure values of the fluid in the lift and tilt cylinders 130 and 132 on a real time basis. The input unit 232 may also provide signal amplification and filtering by using techniques well known in the art.

The processing unit 234 may include for example, but not limited to, a set of instructions, a Random Access Memory (RAM), a Read Only Memory (ROM), flash memory, a data structure, and the like. In one embodiment, the processing unit 234 may store a first and a second threshold pressure values of the fluid corresponding to the lift and tilt cylinders 130 and 132. In an embodiment, the first and the second threshold pressure values of the fluid for the lift and tilt cylinders 130 and 132 may be based on a design and application criterion of the machine 100 for which the rear wheel 114 may lift-off from the ground 116. Moreover, the processing unit 234 may be configured to compare pressure values of the fluid in the lift and tilt cylinders 130 and 132 with the first and the second threshold pressure values and generate an operative signal.

The control module 236, of the control system 230, may be configured to control the electrical energy supply to the electric propulsion motors 208 and 210 from the power source 200 based on the operative signal. The control module 236 may include various limiting means, such as, but not limited to, resistors, capacitors, or the like to control the electrical energy supplied to the electric propulsion motors 208 and 210. In an embodiment, the control module 236 may be integrated with the power electronics 205 in the power source 200.

INDUSTRIAL APPLICABILITY

During operation of the machine 100, when the lift arm assembly 118 lifts the load 128 off the ground 116 in the bucket 124 or maneuvered to place the load 128 in the bucket 124, the centre of gravity of the machine 100 may shift towards the front section 104. This may cause the rear wheels 114 to lift-off above the ground 116. In such a situation, supplying electrical energy to the electric propulsion motors 210, associated with the rear wheels 114, may not be used to generate any traction between the rear wheel 114 and the ground 116.

In the machine 100 of the present disclosure, the control system 230 is configured to determine a lift-off condition for the rear wheels 114 based on the pressure values of fluid in the lift and tilt cylinders 130 and 132. In case of the lift-off condition, the control system 230 may be configured to reduce or stop the electrical energy supply to the electric propulsion motors 210 driving the rear wheels 114. Thus, the control system 230 saves electrical energy that may not be able to provide any traction.

Figure 3:
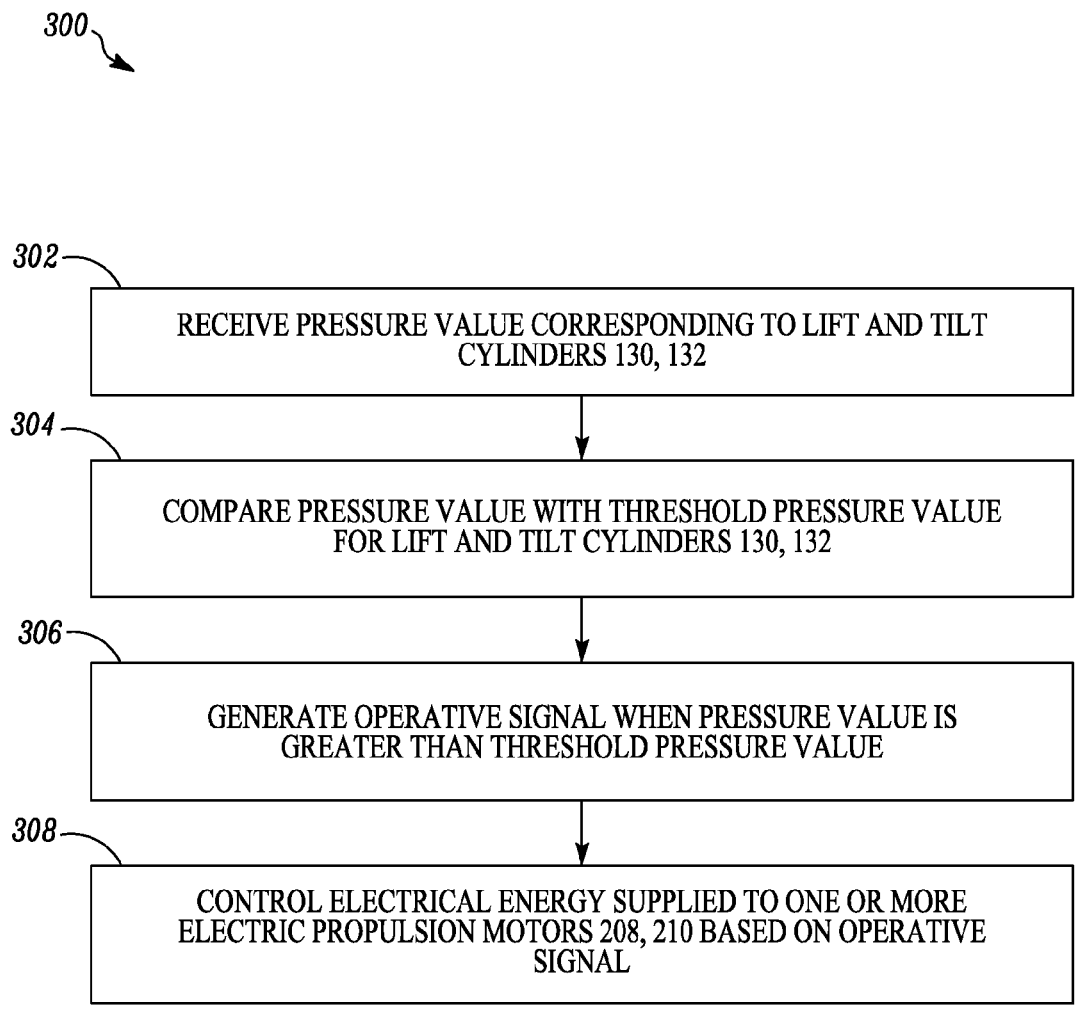
FIG. 3 illustrates a process flow for operating the machine.

FIG. 3 illustrates a process flow 300 to operate the machine 100, according to an exemplary embodiment of the present disclosure. As illustrated in the process flow 300, the step 302 includes receiving pressure values corresponding to the lift and tilt cylinders 130 and 132. The pressure values may be received from the sensor unit 228 connected to the lift and tilt cylinders 130 and 132. The pressure values may be received by the input unit 232 in the control system 230.

In step 304, the processing unit 234 may compare the pressure values with the threshold pressure values. The first and second threshold pressure values may correspond to the lift-off condition of the machine 100. The first and second threshold pressure values may be defined as the pressure values in the lift and tilt cylinders 130 and 132 respectively, when the load 128 in the bucket 124 or maneuvering the lift arm assembly 118 to place the load 128 in the bucket 124 may cause the lift-off condition. The processing unit 234 may compute a difference between the pressure values and the threshold pressure values.

Further, in step 306, the operative signal is generated based on the comparison in step 304. The processing unit 234 may generate the operative signal when the pressure value is greater than the threshold value. The processing unit 234 may deliver the operative signal to the control module 236 in the control system 230.

Finally, in step 308, the control module 236 may control the electrical energy supplied to the electric propulsion motors 208 and 210 in the machine 100 based on the operative signal. The operative signal may carry the instructions to vary the electrical energy supplied based on the computed difference in step 304. The electrical energy supplied may be controlled by the limiting means in the control module 236, which varies the voltage or the electric current at the bus 212 between the power electronics 205 and the electric propulsion motors 208 and 210.

Accordingly, in the machine 100 of the present disclosure, the control system 230 may reduce or eliminate the torque output of the rear wheels 114, when the rear wheels 114 are not be able to produce any productive tractive effort. This may result in reduced electrical energy consumption and significant fuel savings in the machine 100 during operation.

The control system 230 and the process flow 300 of the present disclosure may be applied to any type of machine 100 which handles a load 128. For exemplification, the machine 100 is illustrated as a front wheel loader. But in other embodiments, the machine 100 may be a back-hoe loader, in which the power supplied to the front wheels 112 may need to be controlled in lift-off condition.

Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A control system for a machine having a power source, one or more electric propulsion motors connected to the power source, and one or more lift and tilt cylinders, the control system comprising:
    an input unit configured to receive pressure values corresponding to the lift and tilt cylinders;
    a processing unit configured to compare the pressure values to threshold pressure values for the lift and tilt cylinders to generate an operative signal; and
    a control module configured to control electrical energy supplied to the one or more electric propulsion motors from the power source based on the operative signal.

2. The control system of claim 1, wherein the input unit is configured to receive the pressure values from a sensor unit connected to the lift and tilt cylinders.

3. The control system of claim 1, wherein the threshold pressure values for the lift and tilt cylinders corresponds to a lift-off condition of the machine.

4. The control system of claim 3, wherein the processing unit is configured to store the threshold pressure values for the lift and tilt cylinders.

5. The control system of claim 4, wherein the processing unit generate the operative signal in case the pressure value is greater than the threshold pressure value.

6. The control system of claim 1, wherein the control module configured to stop electrical energy supply to the one or more electric propulsion motors.

7. A machine, the machine comprising:
    a power source;
    one or more electric propulsion motors connected to the power source;
    one or more lift and tilt cylinders; and
    a control system, the control system including:
        an input unit configured to receive pressure values corresponding to the lift and tilt cylinders;
        a processing unit configured to compare the pressure values to threshold pressure values for the lift and tilt cylinders to generate an operative signal; and
        a control module configured to control electrical energy supplied to the one or more electric propulsion motors from the power source based on the operative signal.

8. The machine of claim 7, wherein the one or more electric propulsion motors are configured to provide torque output to front and rear wheels.

9. The machine of claim 7 further includes a sensor unit connected to the lift and tilt cylinders, the sensor unit configured to provide the pressure values to the input unit.

10. The machine of claim 7, wherein the threshold pressure values for the lift and tilt cylinders corresponds to a lift-off condition of the machine.

11. The machine of claim 10, wherein the processing unit is configured to store the threshold pressure values for the lift and tilt cylinders.

12. The machine of claim 11, wherein the processing unit generates the operative signal in case the pressure value is greater than the threshold pressure value.

13. The machine of claim 11, wherein the control module configured to stop electrical energy supply to the one or more electric propulsion motors.

14. A method of operating a machine, the method comprising:
    receiving pressure values corresponding to lift and tilt cylinders;
    comparing the pressure values with threshold pressure values for the lift and tilt cylinders;
    generating an operative signal when the pressure value is greater than the threshold pressure value; and
    controlling electrical energy supplied to one or more electric propulsion motors based on the operative signal.

15. The method of claim 14, wherein receiving the pressure values includes receiving the pressure values from a sensor unit connected to the lift and tilt cylinders.

16. The method of claim 15, wherein comparing the pressure values includes computing a difference between the pressure values and the threshold pressure values.

17. The method of claim 14 further includes defining the threshold pressure value based on a lift-off condition of the machine.

18. The method of claim 17, wherein controlling electrical energy supplied includes stopping the electrical energy supplied to the one or more electric propulsion motors.

19. The method of claim 14 further includes supplying the electrical energy to the one or more electric propulsion motors from a power source.

20. The method of claim 14 further includes providing torque to front and rear wheels of the machine by the one or more electric propulsion motors.

* * * * *